United States Patent
Lowe et al.

(10) Patent No.: US 7,483,916 B2
(45) Date of Patent: Jan. 27, 2009

(54) DATABASE FOR A CAPTURE SYSTEM

(75) Inventors: Rick Lowe, Atherton, CA (US); Stephen Broeker, Mountain View, CA (US)

(73) Assignee: McAfee, Inc., Santa Clara, CA (US)

( * ) Notice: Subject to any disclaimer, the term of this patent is extended or adjusted under 35 U.S.C. 154(b) by 311 days.

(21) Appl. No.: 11/031,582

(22) Filed: Jan. 6, 2005

(65) Prior Publication Data

US 2006/0041570 A1    Feb. 23, 2006

Related U.S. Application Data

(60) Provisional application No. 60/603,950, filed on Aug. 23, 2004.

(51) Int. Cl.
*G06F 17/30* (2006.01)
(52) U.S. Cl. .................... 707/103 Z; 707/101
(58) Field of Classification Search ............. 707/2, 707/3, 100, 101, 103 R, 103 Z, 130 Z; 709/203
See application file for complete search history.

(56) References Cited

U.S. PATENT DOCUMENTS

| | | | |
|---|---|---|---|
| 6,243,091 B1 * | 6/2001 | Berstis | 715/839 |
| 6,493,761 B1 | 12/2002 | Baker et al. | |
| 7,185,073 B1 | 2/2007 | Gai et al. | |
| 2002/0032677 A1 * | 3/2002 | Morgenthaler et al. | 707/3 |
| 2002/0129140 A1 | 9/2002 | Peled et al. | |
| 2003/0105739 A1 | 6/2003 | Essafi et al. | |
| 2005/0021715 A1 | 1/2005 | Dugatkin et al. | |
| 2005/0033803 A1 * | 2/2005 | Vleet et al. | 709/203 |
| 2005/0055399 A1 | 3/2005 | Savchuk | |
| 2005/0132297 A1 * | 6/2005 | Milic-Frayling et al. | 715/745 |

* cited by examiner

*Primary Examiner*—Hung T Vy
(74) *Attorney, Agent, or Firm*—Patent Capital Group

(57) ABSTRACT

A tag database storing tags indexing captured object can be searched efficiently. In one embodiment, such a search begins by receiving a query for one or more objects captured by a capture system, and determining whether a query time range exceeds a time range of a set of fast tables. In one embodiment, the invention further includes searching the set of fast tables if the query time range does not exceed the time range of the fast tables, the set of fast tables containing tags having meta-data related to captured objects. In one embodiment, the invention further includes searching a set of hourly tables if the query time range does exceed the time range of the fast tables. In one embodiment, the present invention further includes searching a set of daily tables if the query time range also exceeds the time range of the hourly tables.

8 Claims, 7 Drawing Sheets

DATABASE FOR A CAPTURE SYSTEM

PRIORITY AND RELATED APPLICATIONS

This patent application is related to, incorporates by reference, and claims the priority benefit of U.S. Provisional Application 60/603,950, entitled "DATABASE FOR A CAPTURE SYSTEM", filed Aug. 23, 2004.

FIELD OF THE INVENTION

The present invention relates to computer networks, and in particular, to a database.

BACKGROUND

Computer networks and systems have become indispensable tools for modern business. Modem enterprises use such networks for communications and for storage. The information and data stored on the network of a business enterprise is often a highly valuable asset. Modem enterprises use numerous tools to keep outsiders, intruders, and unauthorized personnel from accessing valuable information stored on the network. These tools include firewalls, intrusion detection systems, and packet sniffer devices. However, once an intruder has gained access to sensitive content, there is no network device that can prevent the electronic transmission of the content from the network to outside the network. Similarly, there is no network device that can analyse the data leaving the network to monitor for policy violations, and make it possible to track down information leaks. What is needed is a comprehensive system to capture, store, and analyse all data communicated using the enterprise's network.

SUMMARY OF THE INVENTION

A tag database storing tags indexing captured object can be searched efficiently. In one embodiment, such a search begins by receiving a query for one or more objects captured by a capture system, and determining whether a query time range exceeds a time range of a set of fast tables. In one embodiment, the invention further includes searching the set of fast tables if the query time range does not exceed the time range of the fast tables, the set of fast tables containing tags having meta-data related to captured objects.

In one embodiment, the invention further includes searching a set of hourly tables if the query time range does exceed the time range of the fast tables. In one embodiment, the present invention further includes searching a set of daily tables if the query time range also exceeds the time range of the hourly tables.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Networks

Figure 1:
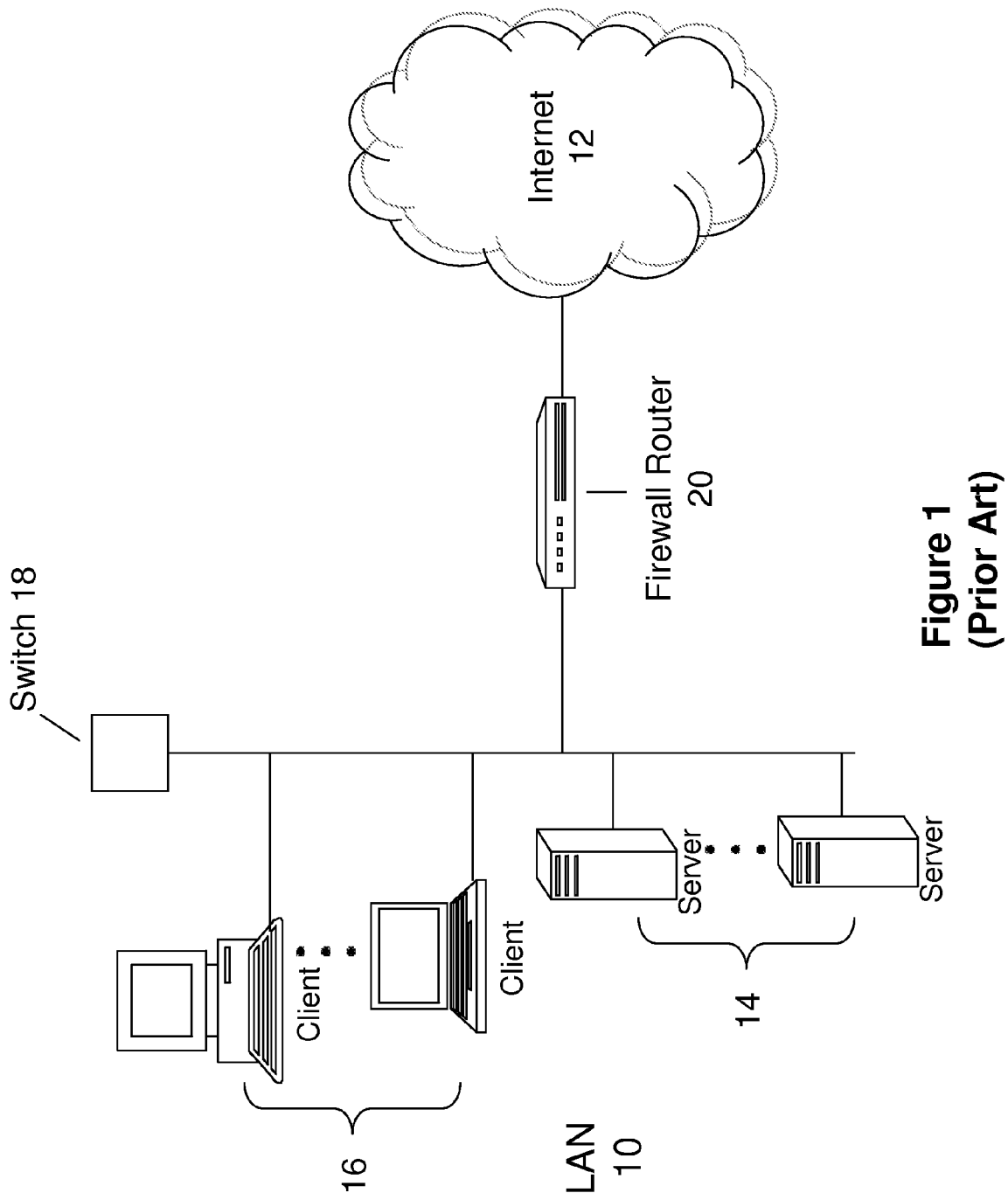
FIG. 1 is a block diagram illustrating a computer network connected to the Internet.

FIG. 1 illustrates a simple prior art configuration of a local area network (LAN) 10 connected to the Internet 12. Connected to the LAN 102 are various components, such as servers 14, clients 16, and switch 18. There are numerous other known networking components and computing devices that can be connected to the LAN 10. The LAN 10 can be implemented using various wireline or wireless technologies, such as Ethernet and 802.11b. The LAN 10 may be much more complex than the simplified diagram in FIG. 1, and may be connected to other LANs as well.

In FIG. 1, the LAN 10 is connected to the Internet 12 via a router 20. This router 20 can be used to implement a firewall, which are widely used to give users of the LAN 10 secure access to the Internet 12 as well as to separate a company's public Web server (can be one of the servers 14) from its internal network, i.e., LAN 10. In one embodiment, any data leaving the LAN 10 towards the Internet 12 must pass through the router 12. However, there the router 20 merely forwards packets to the Internet 12. The router 20 cannot capture, analyze, and searchably store the content contained in the forwarded packets.

Figure 2:
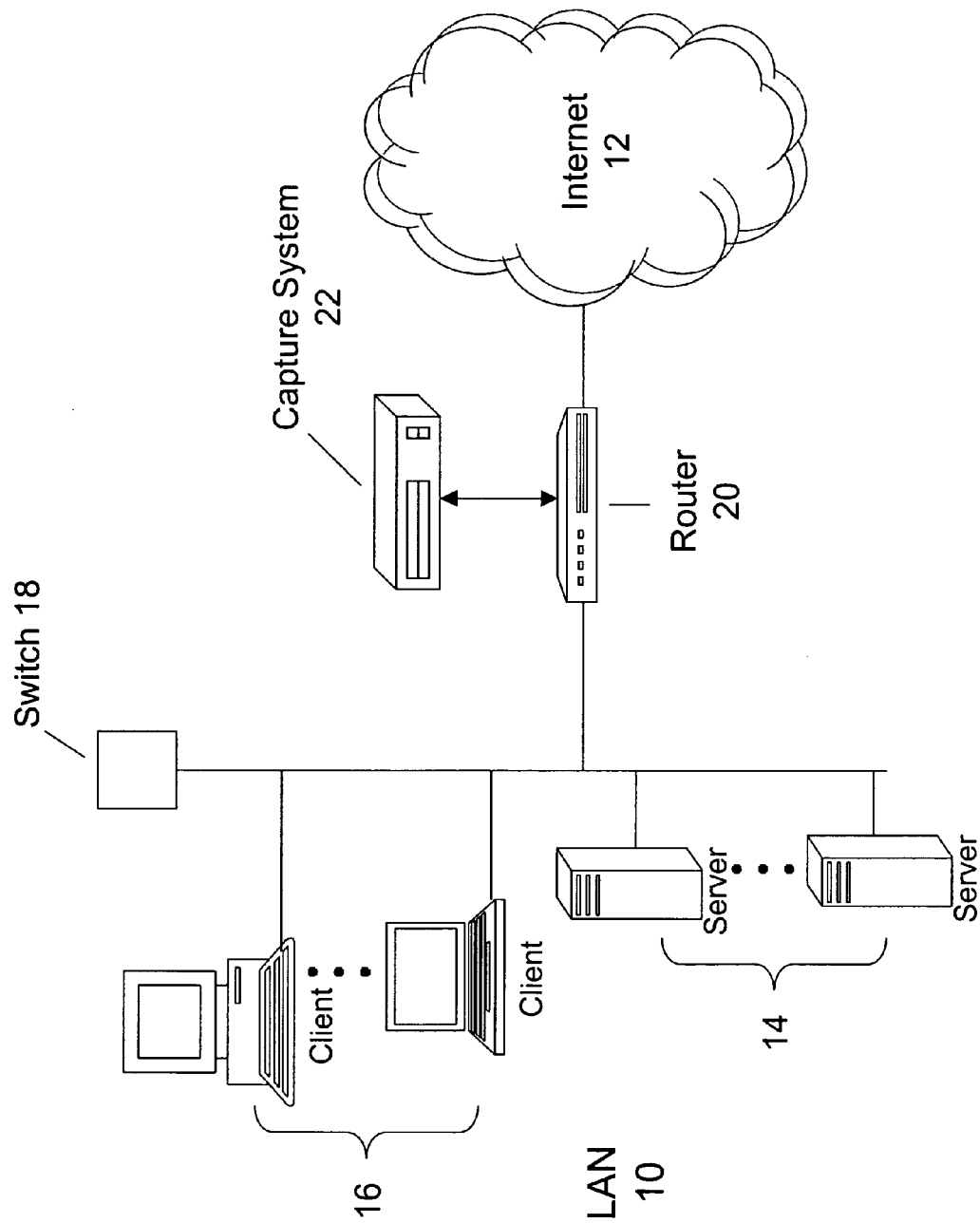
FIG. 2 is a block diagram illustrating one configuration of a capture system according to one embodiment of the present invention.

One embodiment of the present invention is now illustrated with reference to FIG. 2. FIG. 2 shows the same simplified configuration of connecting the LAN 10 to the Internet 12 via the router 20. However, in FIG. 2, the router 20 is also connected to a capture system 22. In one embodiment, the router 12 splits the outgoing data stream, and forwards one copy to the Internet 12 and the other copy to the capture system 22.

There are various other possible configurations. For example, the router 12 can also forward a copy of all incoming data to the capture system 22 as well. Furthermore, the capture system 22 can be configured sequentially in front of, or behind the router 20, however this makes the capture system 22 a critical component in connecting to the Internet 12. In systems where a router 12 is not used at all, the capture system can be interposed directly between the LAN 10 and the Internet 12. In one embodiment, the capture system 22 has a user interface accessible from a LAN-attached device, such as a client 16.

In one embodiment, the capture system 22 intercepts all data leaving the network. In other embodiments, the capture system can also intercept all data being communicated inside the network 10. In one embodiment, the capture system 22 reconstructs the documents leaving the network 10, and stores them in a searchable fashion. The capture system 22 can then be used to search and sort through all documents that have left the network 10. There are many reasons such documents may be of interest, including network security reasons, intellectual property concerns, corporate governance regulations, and other corporate policy concerns.

Capture System

Figure 3:
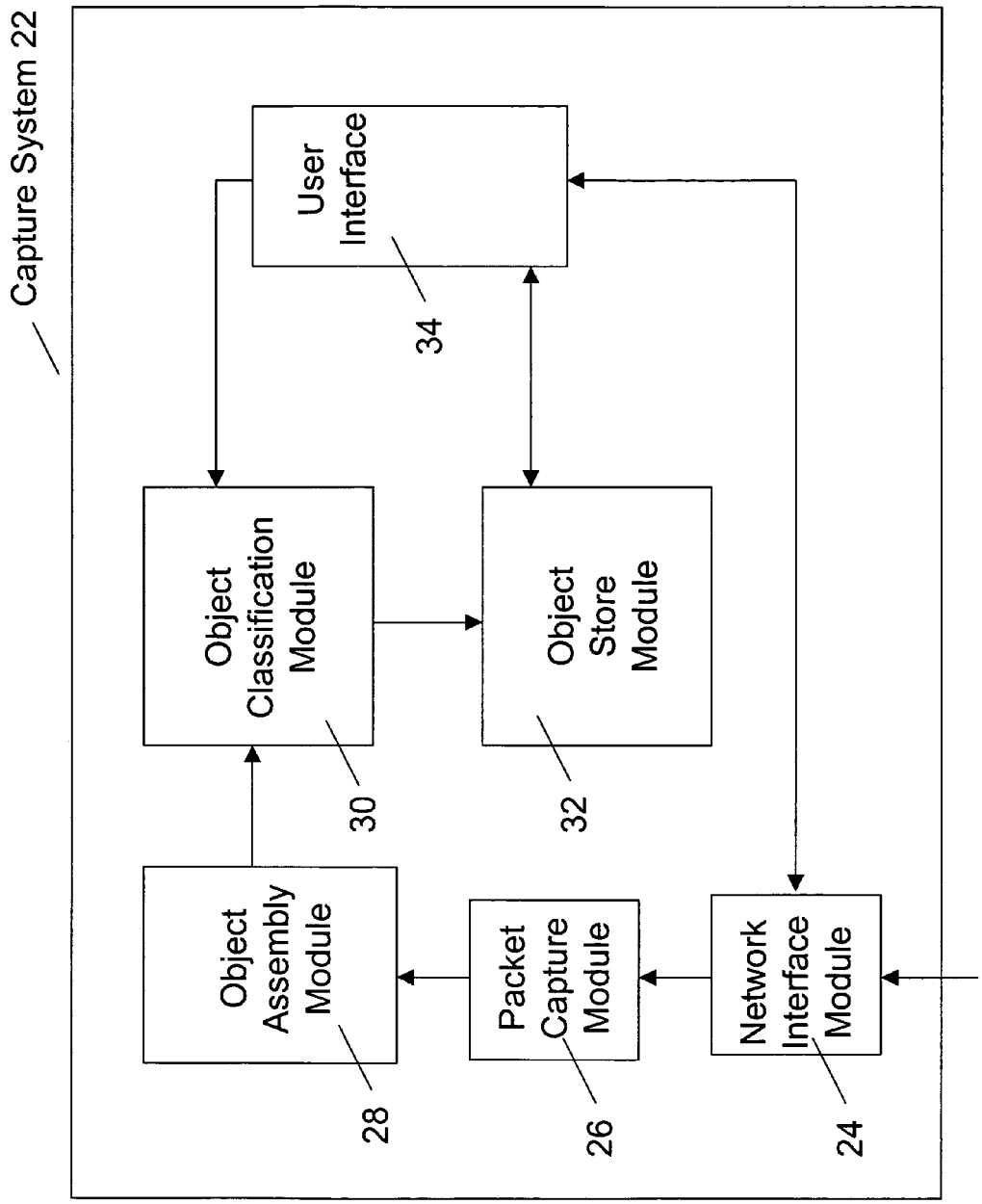
FIG. 3 is a block diagram illustrating the capture system according to one embodiment of the present invention.

One embodiment of the present invention is now described with reference to FIG. 3. FIG. 3 shows one embodiment of the capture system 22 in more detail. The capture system 22 includes a network interface module 24 to receive the data from the network 10 or the router 20. In one embodiment, the network interface module 24 is implemented using one or more network interface cards (NIC), e.g., Ethernet cards. In one embodiment, the router 20 delivers all data leaving the network to the network interface module 24.

The captured raw data is then passed to a packet capture module 26. In one embodiment, the packet capture module 26 extracts data packets from the data stream received from the network interface module 24. In one embodiment, the packet capture module 26 reconstructs Ethernet packets from multiple sources to multiple destinations for the raw data stream.

In one embodiment, the packets are then provided the object assembly module 28. The object assembly module 28 reconstructs the objects being transmitted by the packets. For example, when a document is transmitted, e.g. as an email attachment, it is broken down into packets according to various data transfer protocols such as Transmission Control Protocol/Internet Protocol (TCP/IP) and Ethernet. The object assembly module 28 can reconstruct the document from the captured packets.

Figure 4:
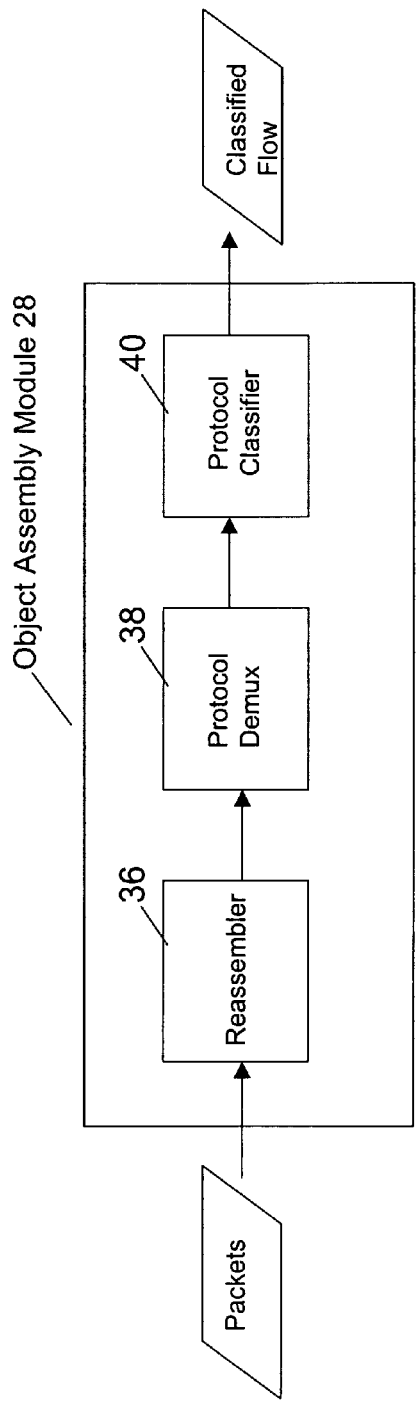
FIG. 4 is a block diagram illustrating an object assembly module according to one embodiment of the present invention.

One embodiment of the object assembly module 28 is now described in more detail with reference to FIG. 4. When packets first enter the object assembly module, they are first provided to a reassembler 36. In one embodiment, the reassembler 36 groups—assembles—the packets into unique flows. For example, a flow can be defined as packets with identical Source IP and Destination IP addresses as well as identical TCP Source and Destination Ports. That is, the reassembler 36 can organize a packet stream by sender and recipient.

In one embodiment, the reassembler 36 begins a new flow upon the observation of a starting packet defined by the data transfer protocol. For a TCP/IP embodiment, the starting packet is generally referred to as the "SYN" packet. The flow can terminate upon observation of a finishing packet, e.g., a "Reset" or "FIN" packet in TCP/IP. If now finishing packet is observed by the reassembler 36 within some time constraint, it can terminate the flow via a timeout mechanism. In an embodiment using the TPC protocol, a TCP flow contains an ordered sequence of packets that can be assembled into a contiguous data stream by the ressembler 36. Thus, in one embodiment, a flow is an ordered data stream of a single communication between a source and a destination.

The flown assembled by the reassember 36 can then is provided to a protocol demultiplexer (demux) 38. In one embodiment, the protocol demux 38 sorts assembled flows using the TCP Ports. This can include performing a speculative classification of the flow contents based on the association of well-known port numbers with specified protocols. For example, Web Hyper Text Transfer Protocol (HTTP) packets—i.e., Web traffic—are typically associated with port 80, File Transfer Protocol (FTP) packets with port 20, Kerberos authentication packets with port 88, and so on. Thus in one embodiment, the protocol demux 38 separates all the different protocols in one flow.

In one embodiment, a protocol classifier 40 also sorts the flows in addition to the protocol demux 38. In one embodiment, the protocol classifier 40—operating either in parallel or in sequence with the protocol demux 38—applies signature filters to the flows to attempt to identify the protocol based solely on the transported data. Furthermore, the protocol demux 38 can make a classification decision based on port number, which is subsequently overridden by protocol classifier 40. For example, if an individual or program attempted to masquerade an illicit communication (such as file sharing) using an apparently benign port such as port 80 (commonly used for HTTP Web browsing), the protocol classifier 40 would use protocol signatures, i.e., the characteristic data sequences of defined protocols, to verify the speculative classification performed by protocol demux 38.

In one embodiment, the object assembly module 28 outputs each flow organized by protocol, which represent the underlying objects. Referring again to FIG. 3, these objects can then be handed over to the object classification module 30 (sometimes also referred to as the "content classifier") for classification based on content. A classified flow may still contain multiple content objects depending on the protocol used. For example, protocols such as HTTP (Internet Web Surfing) may contain over 100 objects of any number of content types in a single flow. To deconstruct the flow, each object contained in the flow is individually extracted, and decoded, if necessary, by the object classification module 30.

The object classification module 30 uses the inherent properties and signatures of various documents to determine the content type of each object. For example, a Word document has a signature that is distinct from a PowerPoint document, or an Email document. The object classification module 30 can extract out each individual object and sort them out by such content types. Such classification renders the present invention immune from cases where a malicious user has altered a file extension or other property in an attempt to avoid detection of illicit activity.

In one embodiment, the object classification module 30 determines whether each object should be stored or discarded. In one embodiment, this determination is based on a various capture rules. For example, a capture rule can indicate that Web Traffic should be discarded. Another capture rule can indicate that all PowerPoint documents should be stored, except for ones originating from the CEO's IP address. Such capture rules can be implemented as regular expressions, or by other similar means. Several embodiments of the object classification module 30 are described in more detail further below.

In one embodiment, the capture rules are authored by users of the capture system 22. The capture system 22 is made accessible to any network-connected machine through the network interface module 24 and user interface 34. In one embodiment, the user interface 34 is a graphical user interface providing the user with friendly access to the various features of the capture system 22. For example, the user interface 34 can provide a capture rule authoring tool that allows users to write and implement any capture rule desired, which are then applied by the object classification module 30 when determining whether each object should be stored. The user interface 34 can also provide pre-configured capture rules that the user can select from along with an explanation of the operation of such standard included capture rules. In one embodiment, the default capture rule implemented by the object classification module 30 captures all objects leaving the network 10.

Figure 5:
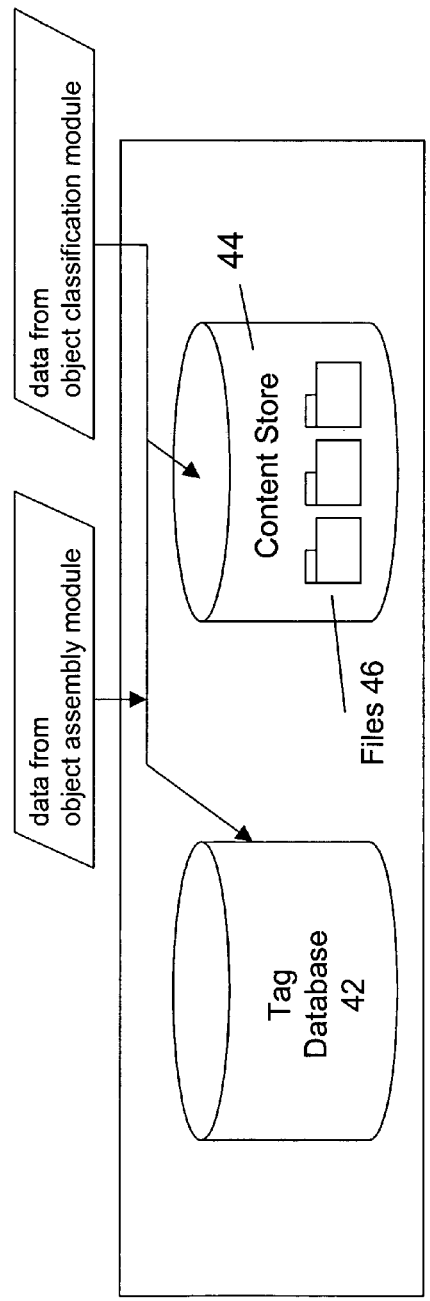
FIG. 5 is a block diagram illustrating an object store module according to one embodiment of the present invention.

If the capture of an object is mandated by the capture rules, the object classification module 30 can also determine where in the object store module 32 the captured object should be stored. With reference to FIG. 5, in one embodiment, the objects are stored in a content store 44 memory block. Within the content store 44 are files 46 divided up by content type. Thus, for example, if the object classification module determines that an object is a Word document that should be stored, it can store it in the file 46 reserved for Word documents. In one embodiment, the object store module 32 is integrally included in the capture system 22. In other embodiments, the object store module can be external—entirely or in part—using, for example, some network storage technique such as network attached storage (NAS) and storage area network (SAN).

Tag Data Structure

In one embodiment, the content store is a canonical storage location, simply a place to deposit the captured objects. The indexing of the objects stored in the content store 44 is accomplished using a tag database 42. In one embodiment, the tag database 42 is a database data structure in which each record is a "tag" that indexes an object in the content store 44 and contains relevant information about the stored object. An example of a tag record in the tag database 42 that indexes an object stored in the content store 44 is set forth in Table 1:

TABLE 1

| Field Name | Definition |
| --- | --- |
| MAC Address | Ethernet controller MAC address unique to each capture system |
| Source IP | Source Ethernet IP Address of object |
| Destination IP | Destination Ethernet IP Address of object |
| Source Port | Source TCP/IP Port number of object |
| Destination Port | Destination TCP/IP Port number of the object |
| Protocol | IP Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Hash signature of object |
| Tag Signature | Hash signature of all preceding tag fields |

There are various other possible tag fields, and some embodiments can omit numerous tag fields listed in Table 1. In other embodiments, the tag database 42 need not be implemented as a database, and a tag need not be a record. Any data structure capable of indexing an object by storing relational data over the object can be used as a tag data structure. Furthermore, the word "tag" is merely descriptive, other names such as "index" or "relational data store," would be equally descriptive, as would any other designation performing similar functionality.

The mapping of tags to objects can, in one embodiment, be obtained by using unique combinations of tag fields to construct an object's name. For example, one such possible combination is an ordered list of the Source IP, Destination IP, Source Port, Destination Port, Instance and Timestamp. Many other such combinations including both shorter and longer names are possible. In another embodiment, the tag can contain a pointer to the storage location where the indexed object is stored.

The tag fields shown in Table 1 can be expressed more generally, to emphasize the underlying information indicated by the tag fields in various embodiments. Some of these possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of the capture system 22. Only the capture system 22 knows its own private key, thus, the integrity of the stored object can be verified by comparing a hash of the stored object to the signature decrypted with the public key of the capture system 22, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

Tag Database

One embodiment of the tag database 42 is now described in more detail with reference to FIG. 7. As described above, the tag database 42 is the data structure that stores the tags associated with captured objects. Since, in one embodiment, the objects themselves are stored canonically, it may be beneficial to have a tag database that is efficiently searchable. Furthermore, since objects may be captured at a great rate, it may be beneficial to have a tag database into which new tags can efficiently be inserted.

Figure 7:
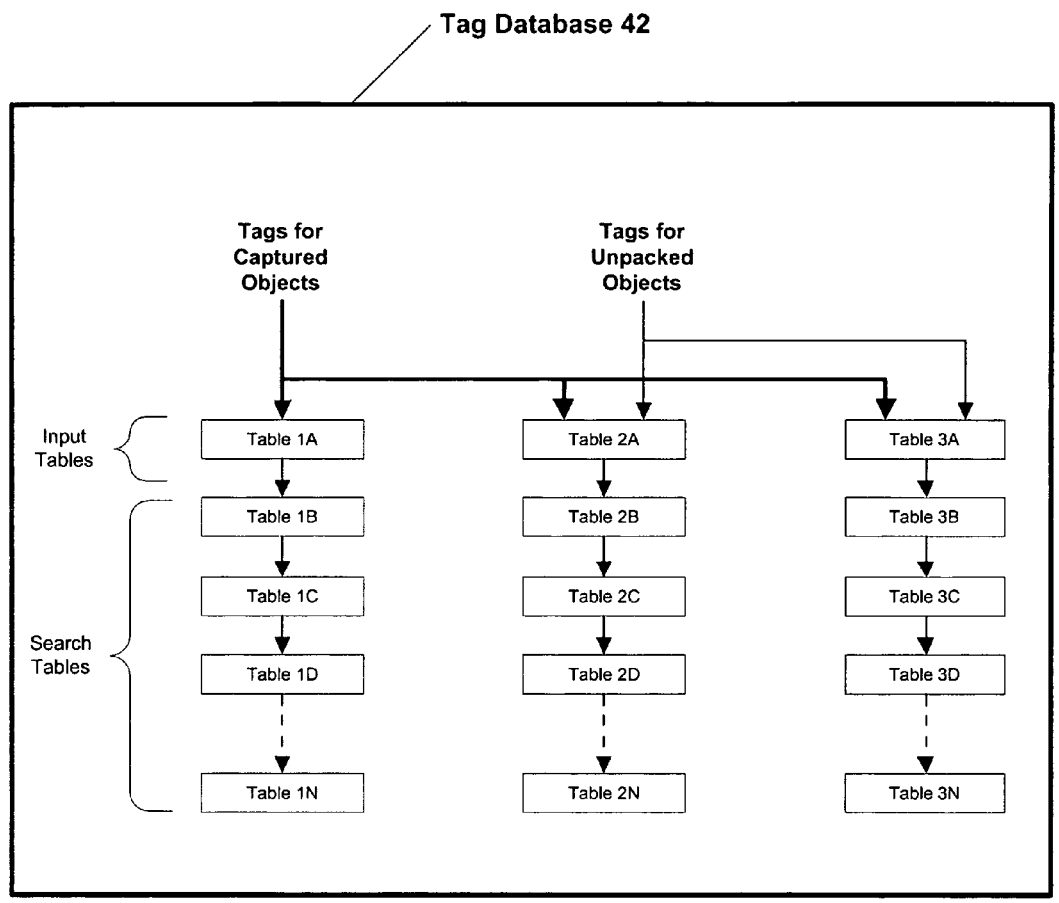
FIG. 7 is a block diagram illustrating a tag database according to one embodiment of the present invention.

In one embodiment, the tag database 42 is logically divided into three sets of tables, the first set labeled as Tables 1A-1N, the second set labeled as Tables 2A-2N, and the third set labeled as Tables 3A-3N in FIG. 7. In other embodiments, there may only be two sets of tables, or there may be more than three sets of tables. In one embodiment, the tables of each set are divided by some time-based field of the tags, such as the "Timestamp" filed described above. In one embodiment, the Timestamp field contains the capture time of the object the tag is used to index. In another embodiment, the tables of each set are divided by the maximum number of entries that can be contained concurrently in each table, or by some other metric not implicitly associated with time or the "Timestamp" field.

For example, each table in the first set (Tables 1A-1N) can contain tags of objects captured within specified 10-minute time ranges. In another example, the granularity of the first set of tables in per hour, the second set (Tables 2A-2N) per day—each table in the second set contains tags for objects captured on the same day—and the third set can have a per week granularity. Many other such time-based divisions and table set granularities are possible.

In one embodiment, the first table for each set (e.g., Table 1A for the first set) is an input-only table. That is, in one embodiment, Tables 1A, 2A, and 3A are not part of queries over the database 42. This helps speed the insertion operation. So, for example, when the specified interval is up (i.e., Table 1A is closed), the first set of tables cascades "down." Specifically, Table 1N is dropped from the database, Table 1A becomes Table 1B and so on, and a new table is designated Table 1A input table.

In one embodiment, the other sets of tables behave in a similar manner. In one embodiment, the main distinction between the sets of tables is the time interval used by the tables, and thus, the table sizes. For example, in one embodiment, the second set of tables (Tables 2A-2N) can each contain tags for object captured within an interval several times larger than the first interval. Since more objects are captured when utilizing a longer interval, the tables of the second set will necessarily be larger than the tables of the first set. In an embodiment where the first and second set contain the same number of tables, the second set will be able to store more tags than the first set.

However, the granularity of the first set of tables is finer than the second set, since each table in the first set only stores tags generated within the specified window. Thus, when the first set of search tables (Tables 1B-1N) are searched over, the search is faster, since only a smaller table must be searched.

In one embodiment, the third set of tables has even less granularity than the second set. In one embodiment, each table of the third set (Tables 3A-3N) stores tags generated during an even longer interval than the second set. In other embodiments, the granularities of the three sets of tables can be set differently. In one embodiment, the granularity of Tables 1A-1N is finer than the granularity of Tables 2A-2N, which in turn is finer than the granularity of Tables 3A-3N.

In one embodiment, the second and third set of tables also cascade, similarly to the cascading of the first set of tables described above. In one embodiment, tags are inserted into all three input tables (Tables 1A, 1B, and 1C) simultaneously. When the last table of the first set (Table 1N) expires and is dropped, the tags stored in that table are not lost, since they are still retained in the larger tables of the two other sets.

Similarly, when the last table of the second set (Table 2N) expires and is dropped, the tags stored in that table are not lost, since they are still retained in the larger tables of the third set. However, the events in Table 3N are permanently dropped when the third set cascades, unless a fourth set of larger tables with less fine granularity is used.

As described above, ordinarily, inserting tags into the database is made simple by the dedicated input tables (Tables 1A, 1B, and 1C). However, such a scheme limits the insertion of tags into each set of tables by the granularity of each set. For example, if the granularity of the first set is five minutes, then a tag generated for an object captured 10 minutes ago cannot be inserted into Table 1A, since the events for the appropriate time window have already cascaded to Table 1B, which is not an input table.

The scenario described above can occur for various reasons. For example, the capture system 22 may be overwhelmed by the number of objects being captured, so tag generation for certain objects may take longer than the time window for Table 1A. More commonly, the time it takes to unpack objects within captured objects may be greater than the granularity of the first set of tables.

For example, an email transmission may be captured as one object. A tag generated for the object is then inserted into the input tables (Tables 1A, 1B, and 1C). The example email also contains an attached image. By the time this image is extracted and classified however, Table 1A is receiving tags for object captured in the time window after the captured email.

Thus, the tag for the extracted image cannot be inserted into the first set of tables (Tables 1A-1N). However, the tag for the extracted image can be inserted into the other two input tables (Tables 2A and 3A), since they have not yet cascaded. If the second set of tables have also cascaded since the capture of the embedded object, then the tag can be inserted into Table 3A. This situation also arises when a zip file, or other such compressed file is captured as an object, and unpacking the objects included in the zip file takes longer than the time window for Table 1A.

Figure 8:
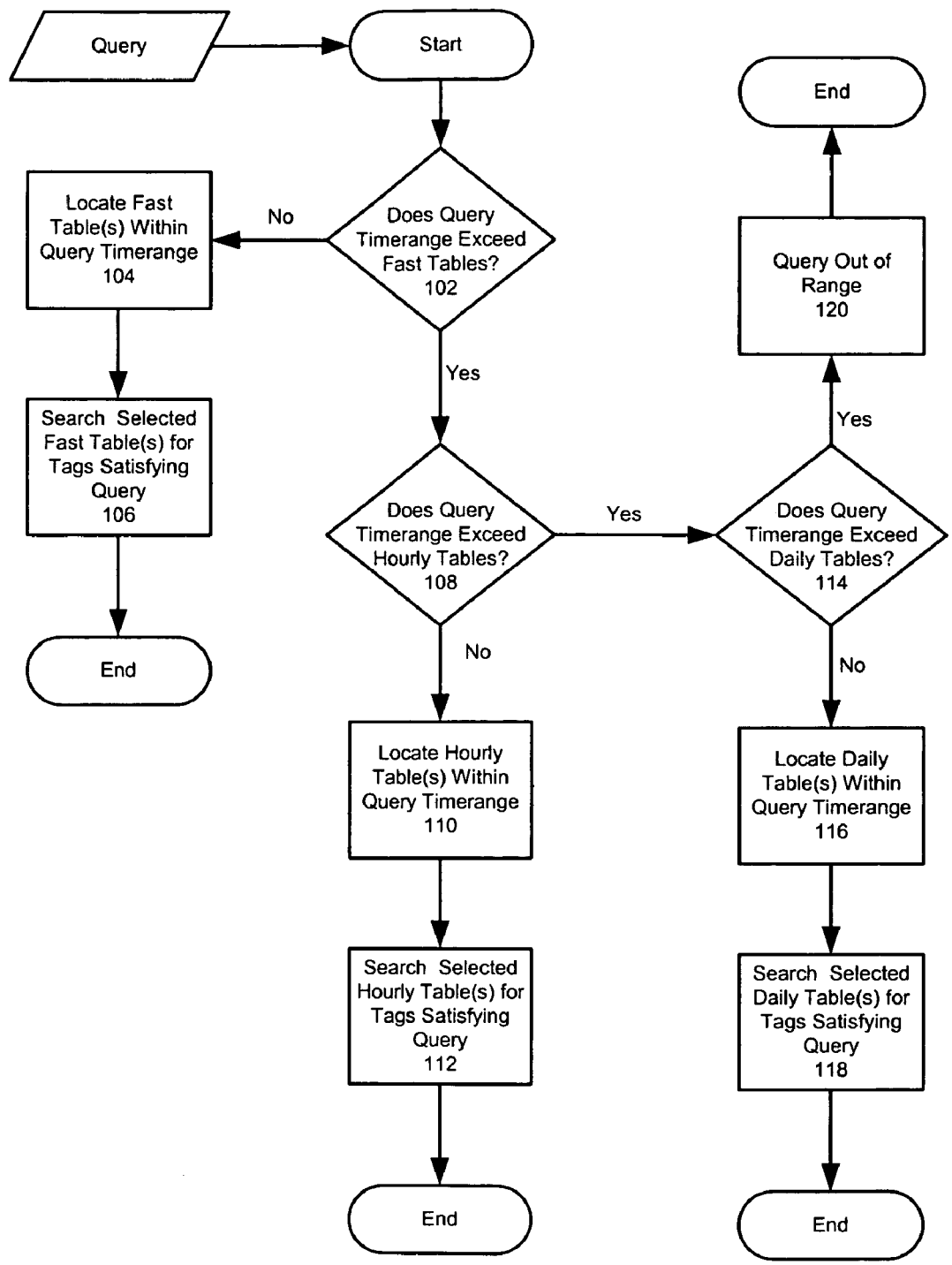
FIG. 8 is a flow diagram illustrating database querying according to one embodiment of the present invention.

In one embodiment, the nature of the database described above, in addition to efficient insertion of new tags, also allows for efficient searching of the database. One embodiment for running a query over the database is now described with reference to FIG. 8. A query over the tag database may be an individual search for objects, or a scheduled report. In one embodiment, object can be queried and retrieved only by first locating the tag associated with the object in the tag database.

In block 102, it is determined whether the time range covered by the query exceeds the first set of tables. In one embodiment, the first set of tables are referred to as the "fast" tables, because searching them is faster because of their finer granularity. In one embodiment, the fast tables are divided by a 2-minute interval and cover a time range of half an hour. Thus, in this embodiment, if the query time range is outside the last half hour window, then the query time range would exceed the fast table time range.

If the query time range does not exceed the fast tables, then, in block 104, the appropriate fast table or tables are located based on the query time range. For example, if the query is for a specific tag captured 30 minutes ago, then the fast table containing the tags for object captured in the 25-30 minutes ago table is selected. If the query time range spans more than one fast table, whether consecutive or not, each necessary fast table is located and selected.

In block 106, the selected fast tables are searched for the specific tags satisfying the query. Searching the fast tables is quick because the table sizes are relatively small and the fast tables are thus quick to traverse. The tags satisfying the query are thus identified and the process terminates. The objects associated with the retrieved tags can now be also retrieved, if desired.

However, if the query time range does exceed the fast tables, then, in block 108, it is determined whether the time range covered by the query exceeds the second set of tables, also referred to in one embodiment as the "hourly" tables. In one embodiment, the hourly tables are divided by a one-hour interval and cover a time range of 24 hours. Thus, in this embodiment, if the query time range is outside the last 24 hour window, then the query time range would exceed the hourly table time range. In another embodiment, the "hourly" tables are divided by a two-hour interval and cover a time range of 48 hours.

If the query time range does not exceed the hourly tables, then, in block 110, the appropriate hourly table or tables are located based on the query time range, similarly to the process performed in block 104 for the fast tables. Then, in block 112, the selected hourly tables are searched for the specific tags satisfying the query, and the process terminates.

However, if in block 108 the query time range is found to exceed the hourly tables as well, then, in block 114, it is determined whether the time range covered by the query exceeds the third set of tables, also referred to in one embodiment as the "daily" tables. In one embodiment, the daily tables are divided by a one-day interval and cover a time range of 15 days. Thus, in this embodiment, if the query time range is outside the last 15 days window, then the query time range would exceed the daily table time range. In another embodiment, the "daily" tables are divided by a one-day interval and extended to cover a time range of 60 days by increasing the number of "daily" tables from 15 to 60.

If the query time range does not exceed the daily tables, then, in block 116, the appropriate daily table or tables are located based on the query time range, similarly to the process performed in block 104 for the fast tables. Then, in block 118, the selected daily tables are searched for the specific tags satisfying the query, and the process terminates.

If the query time range does exceed the daily tables, then, in block 120, it is determined that the query is out of range of the stored tags in the tag database. That is, the query exceeds the retention threshold of the tag database. In this case, the processing can simply terminate with an error message, or the query can be performed to the extent possible, i.e., with the query revised not to exceed the time range of the daily tables. In other embodiments, where additional table sets are used, these may be search next if they are in range of the query.

In one embodiment, the searching the fast tables is further made efficient by storing the fast tables in memory. In one embodiment, the tag database 42 is divided between the memory complex 50 and the storage complex 52. In one embodiment, the first set of tables (i.e., the fast tables with the finer granularity) are stored in the memory complex 50 and the other tables are stored on disk in the storage complex 52. Since accessing memory is faster than disk, this makes the fast tables even faster to search.

General Matters

In several embodiments, the capture system 22 has been described above as a stand-alone device. However, the capture system of the present invention can be implemented on any appliance capable of capturing and analyzing data from a network. For example, the capture system 22 described above could be implemented on one or more of the servers 14 or clients 16 shown in FIG. 1. The capture system 22 can interface with the network 10 in any number of ways, including wirelessly.

Figure 6:
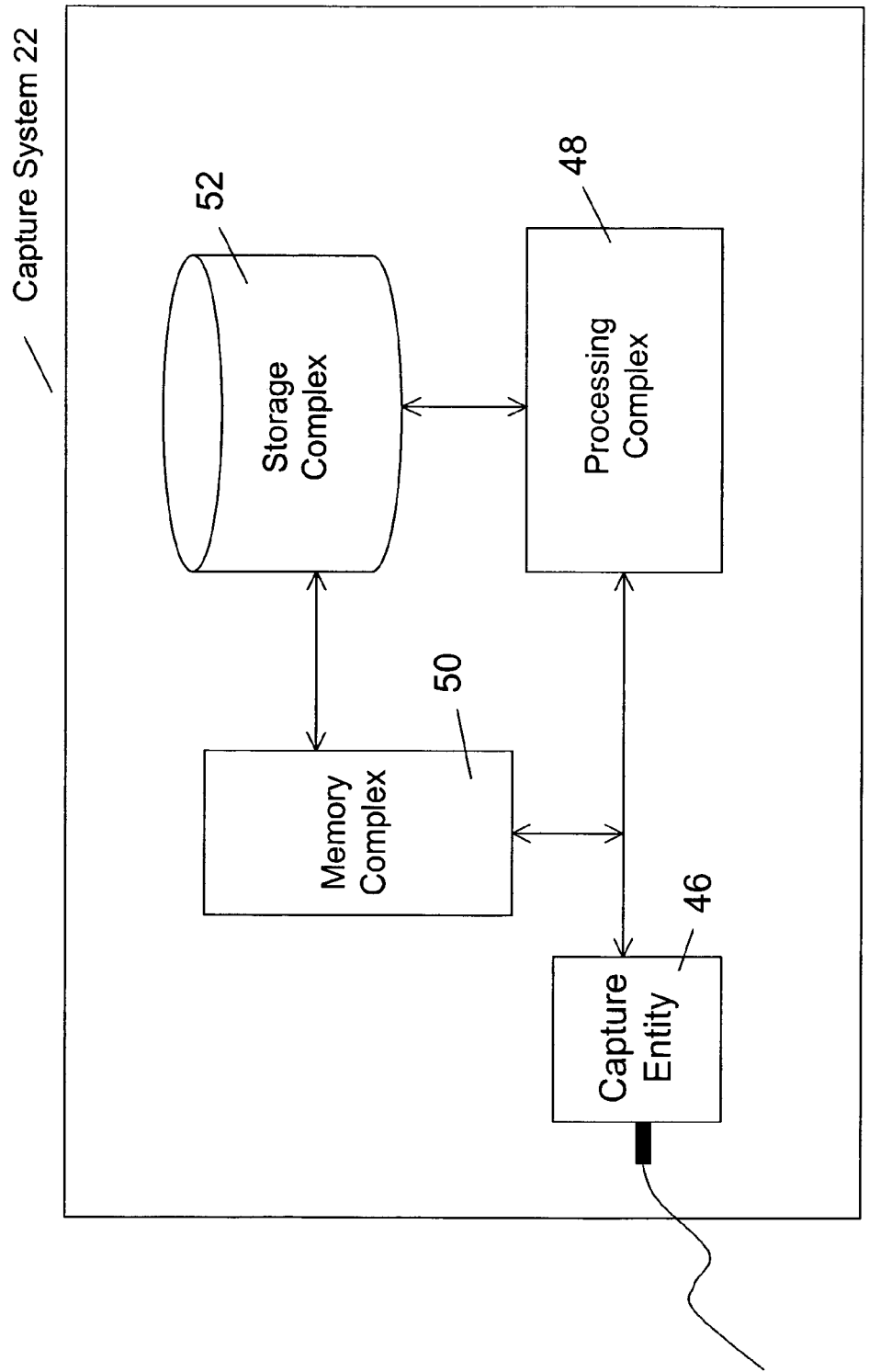
FIG. 6 is a block diagram illustrating an example hardware architecture for a capture system according to one embodiment of the present invention.

In one embodiment, the capture system 22 is an appliance constructed using commonly available computing equipment and storage systems capable of supporting the software requirements. In one embodiment, illustrated by FIG. 6, the hardware consists of a capture entity 46, a processing complex 48 made up of one or more processors, a memory complex 50 made up of one or more memory elements such as RAM and ROM, and storage complex 52, such as a set of one or more hard drives or other digital or analog storage means.

In another embodiment, the storage complex 52 is external to the capture system 22, as explained above. In one embodiment, the memory complex stored software consisting of an operating system for the capture system device 22, a capture program, and classification program, a database, a filestore, an analysis engine and a graphical user interface.

Thus, a capture system and an object classification procedure have been described. In the forgoing description, various specific values were given names, such as "tags," and various specific modules, such as the "object store module" and "tag database" have been described. However, these names are merely to describe and illustrate various aspects of the present invention, and in no way limit the scope of the present invention. Furthermore various modules can be implemented as software or hardware modules, or without dividing their functionalities into modules at all. The present invention is not limited to any modular architecture either in software or in hardware, whether described above or not.

What is claimed is:

1. A computer implemented method comprising:
    inserting a tag into a first input table, a second input table, and a third input table simultaneously, the first, second, and third input tables corresponding with a first, second, and third set of cascading tables respectively, wherein
        the tag indexes a captured object in storage and contains information about the captured object,
        the first set of cascading tables have a first granularity, the second set of cascading tables have a second granularity, the third set of cascading tables have a third granularity, the first granularity is finer than the second granularity, and the second granularity is finer than the third granularity; and
    upon the filling of the first input table, dropping the last table of the first set of cascading tables, designating the first input table as a read-only table, and creating a new input table for the first set of cascading tables.

2. The computer implemented method of claim 1, further comprising upon the filling of the second input table, dropping the last table of the second set of cascading tables, designating the second input table as a read-only table, and creating another new input table for the second set of cascading tables.

3. The computer implemented method of claim 1, wherein the granularity for each table in the first set of tables comprises tags associated with objects captured within 5 minutes of one another.

4. The computer implemented method of claim 1, wherein each table in the second set of tables comprises tags associated with objects captured within one hour of one another.

5. A machine-readable medium having stored thereon data representing instructions that, when executed by a processor, cause the processor to perform operations comprising:
    inserting a tag into a first input table, a second input table, and a third input table simultaneously, the first, second, and third input tables corresponding with a first, second, and third set of cascading tables respectively, wherein
        the tag indexes a captured object in storage and contains information about the captured object,
        the first set of cascading tables have a first granularity, the second set of cascading tables have a second granularity, the third set of cascading tables have a third granularity, the first granularity is finer than the second granularity, and the second granularity is finer than the third granularity; and
    upon the filling of the first input table, dropping the last table of the first set of cascading tables, designating the first input table as a read-only table, and creating a new input table for the first set of cascading tables.

6. The machine-readable medium of claim 5, wherein the instructions further cause the processor to, upon the filling of the second input table, drop the last table of the second set of cascading tables, designating the second input table as a read-only table, and creating another new input table for the second set of cascading tables.

7. The machine-readable medium of claim 5, wherein the granularity for each table in the first set of tables comprises tags associated with objects captured within 5 minutes of one another.

8. The machine-readable medium of claim 5, wherein the granularity for each table in the second set of tables comprises tags associated with objects captured within one hour of one another.

* * * * *